(No Model.) 2 Sheets—Sheet 2.
P. LANGE & O. B. SHALLENBERGER.
ELECTRIC GALVANOMETER.
No. 366,410. Patented July 12, 1887.
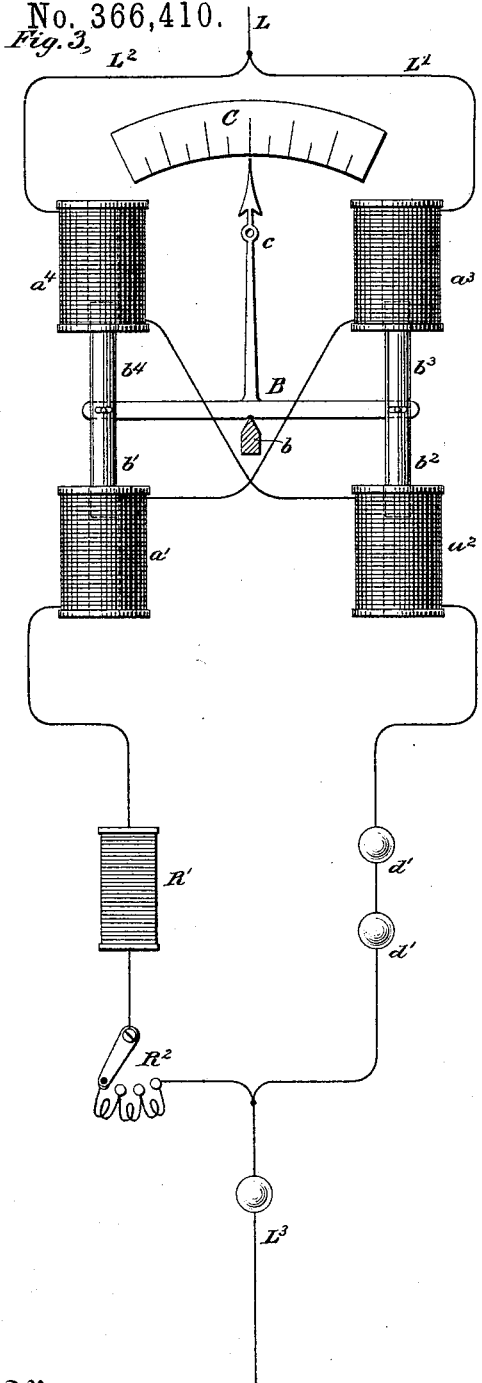
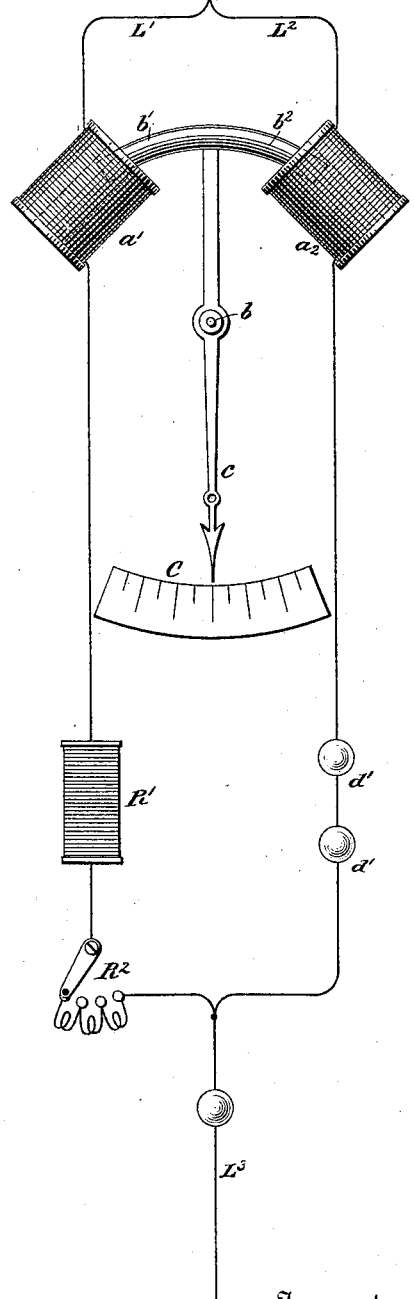
Witnesses
Geo. W. Breck.
Carrie E. Ashley
Inventors
Philip Lange
O. B. Shallenberger
By their Attorneys
Bspe & Edgecomb

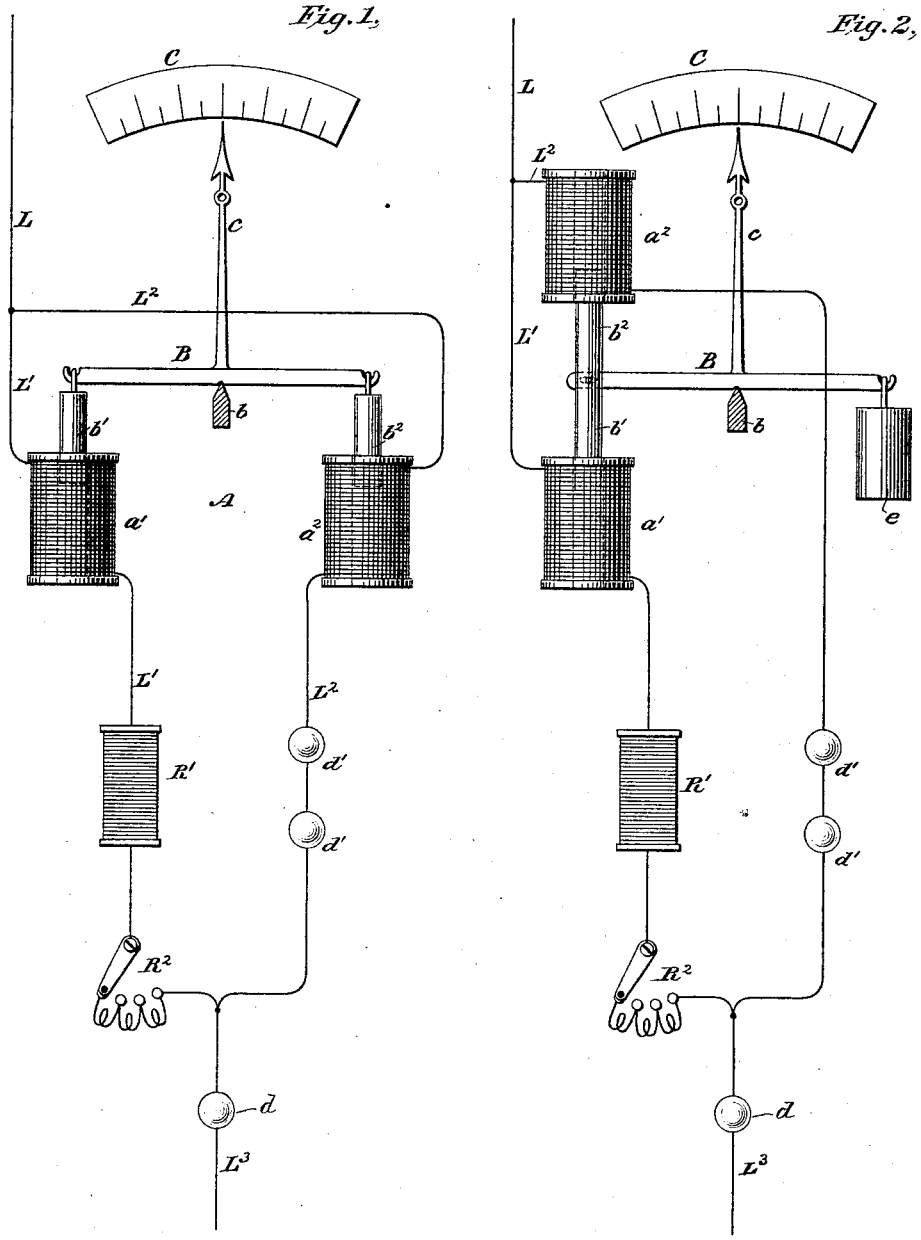

UNITED STATES PATENT OFFICE.

PHILIP LANGE, OF PITTSBURG, AND OLIVER B. SHALLENBERGER, OF ROCHESTER, ASSIGNORS TO GEORGE WESTINGHOUSE, JR., OF PITTSBURG, PENNSYLVANIA.

ELECTRIC GALVANOMETER.

SPECIFICATION forming part of Letters Patent No. 366,410, dated July 12, 1887.

Application filed December 16, 1886. Serial No. 221,713. (No model.)

*To all whom it may concern:*

Be it known that we, PHILIP LANGE, a subject of the Emperor of Germany, residing in Pittsburg, in the county of Allegheny and State of Pennsylvania, and OLIVER B. SHALLENBERGER, a citizen of the United States, residing in Rochester, in the county of Beaver, in the State of Pennsylvania, have invented certain new and useful Improvements in Electric Meters, of which the following is a specification.

The invention relates to the class of apparatus employed for determining the current flowing through any given circuit-supplying translating devices, and for affording means for indicating to the engineer or attendant the amount of translating being done upon a given circuit.

In the accompanying drawings, Figure 1 is a diagram illustrating an organization of apparatus embodying the features of the invention. Figs. 2, 3, and 4 illustrate modifications.

Referring to the figures, L represents a main line, divided into branches $L'$ and $L^2$. These unite in the line $L^3$. In the branch $L'$ there is included one coil, $a'$, of an indicating device, A. The other branch, $L^2$, includes the second coil, $a^2$, of this instrument. The two coils are respectively provided with cores $b'$ and $b^2$, suspended from a cross-arm or scale-beam, B. This cross-arm is supported upon a knife-edge, $b$, or in any other suitable manner. A pointer or indicator, $c$, attached to the scale-beam $b$, moves over a graduated scale, C, for the purpose of indicating the relative movements of the cores.

The branch $L^2$ contains a resistance, preferably one or two incandescent electric lights, $d'$ $d'$, and a resistance, $R'$, equivalent to the resistance of the lights when operating at normal brilliancy, is contained in the line $L'$. An adjustable resistance, $R^2$, may be added to the resistance $R'$ in the branch $L'$ to render the balance more perfect.

The resistance in the branch $L'$ should be different from that in the line branch $L^2$. Thus, if the latter is carbon, the former may be metallic. The two will therefore be differently affected by the heat developed by the currents traversing the branches.

Any increase in the current traversing the main lines L and $L^3$ will correspondingly increase the current traversing the branches $L'$ and $L^2$; but the relative current in these two lines will vary with reference to each other by reason of the variation produced in the artificial resistance $R'$ with reference to that in the lamps by the increase of the current. This will in turn affect the current traversing the coils $a'$ $a^2$ and disturb the equilibrium of the indicator $c$, and this will be indicated upon the scale C. In this manner the attendant will be able to note any variation in the work done in the external circuit and adjust the current-supply accordingly.

A lamp or other carbon resistance, $d$, is inserted in the conductor $L^3$ in such manner that all the current delivered to the meter shall traverse it. This serves to reduce the current traversing the circuit and renders it possible to make the coils of low resistance relative to the entire resistance of the circuit in which it is included. This reduces to a minimum the error due to the change produced by the heating of the conductor.

There may be some disadvantage in some instances in having the coils $a'$ $a^2$ upon opposite sides of the axis $b$, for they tend to increase the pressure of the cross-arm B upon the axis or bearing. To avoid this the arrangement shown in Fig. 2 may be adopted. In this instance a weight, $e$, takes the place of the core $b^2$ upon one side of the axis, and the coil $a^2$ is transferred to the opposite side and tends to lift the core $b^2$ in opposition to the action of the coil $a'$ upon the core $b'$. A still more perfect balance may be obtained by the arrangement illustrated in Fig. 3. In this instance four coils are employed. The coil $a'$ is included in the line $L'$, together with a second coil, $a^3$, and the coil $a^2$ is supplemented by a coil, $a^4$, in the line $L^2$. The coils $a'$ and $a^2$ act upon these cores in the same manner as indicated in Fig. 1; but the coils $a^3$ and $a^4$ act upon the cores $b^3$ $b^4$, extending upon opposite sides of the support B, and this lessens the pressure upon the bearing. The operation of this device is similar to that of the other two already described.

In Fig. 4 another arrangement is illustrated. This consists in placing the coils at an angle with reference to each other and in extending a curved core into both, as shown at $b'\,b^2$. In this instance the pointer or index $c$ extends downward from the support $b$. In each of the figures 3, 4, and 5 a lamp is shown as inserted in the conductor $L^3$, for reducing the current through the conductor, as in the case described with reference to Fig. 1.

We claim as our invention—

1. The combination, with a main line and translating devices included in the main line varying the amount of current traversing the same, of an electrical indicator consisting of opposing coils, an index acted upon thereby, branch circuits respectively including said coils, a variable resistance included in one branch circuit, a carbon resistance in the other branch circuit, and an artificial resistance in series with the indicator.

2. The combination, with a conductor and two branch circuits, of a volt-meter consisting of two coils respectively included in the branch circuits of said conductor, cores therefor carried by the support of said indicator, and means for counterbalancing the weight of said cores.

3. The combination, substantially as described, of a main line having two branches, a resistance in one branch, a translating device in the other branch, two coils respectively included in said branches and placed at an angle to each other, a core extending into both of said coils, and a central support for said core.

In testimony whereof we have hereunto subscribed our names this 2d day of November, A. D. 1886.

PHILIP LANGE.
OLIVER B. SHALLENBERGER.

Witnesses:
CHARLES A. TERRY,
J. G. BACKOFEN.